A. S. LINDKWIST.
GAS VALVE.
APPLICATION FILED JAN. 9, 1909.
947,042.
Patented Jan. 18, 1910.
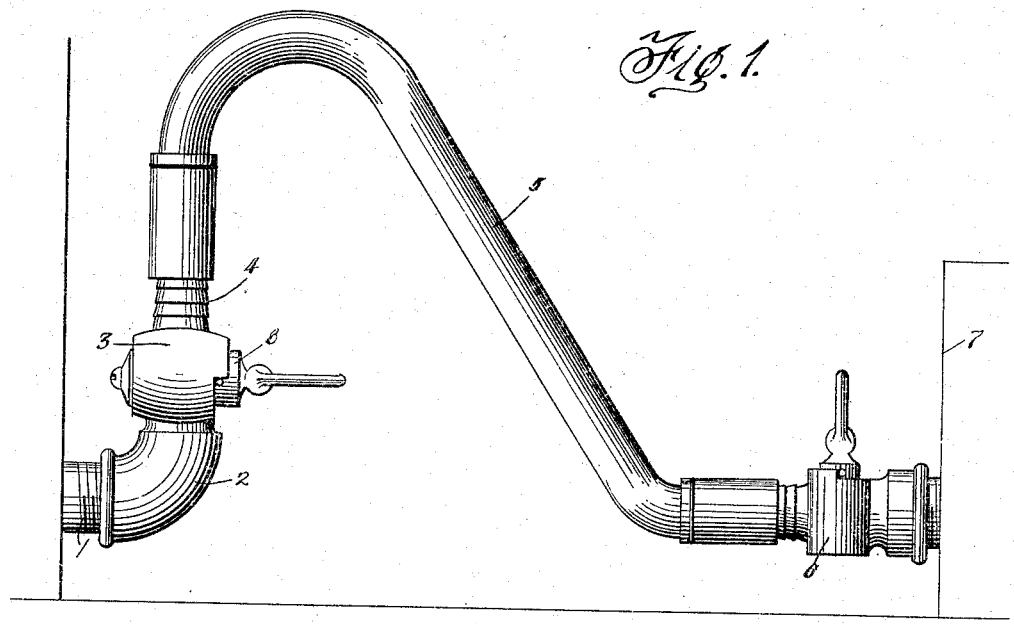
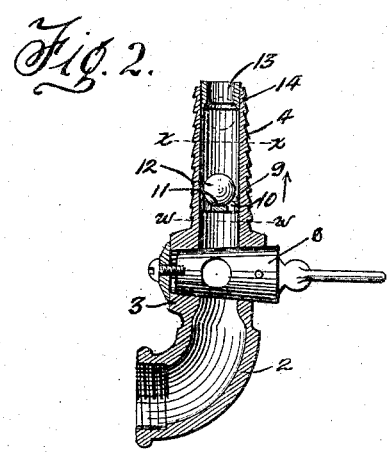
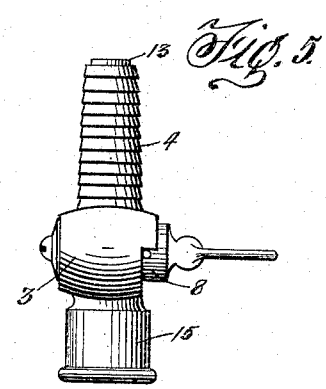
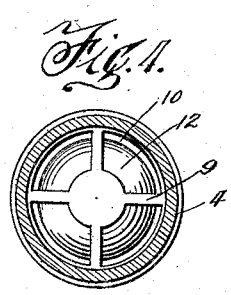
Witnesses
R. L. Farrington.
K. H. Butler
Inventor
A. S. Lindkwist
By H. C. Everts & Co.
Attorneys

UNITED STATES PATENT OFFICE.

ABEL S. LINDKWIST, OF SPRINGDALE, PENNSYLVANIA.

GAS-VALVE.

947,042.  Specification of Letters Patent. Patented Jan. 18, 1910.

Application filed January 9, 1909. Serial No. 471,460.

*To all whom it may concern:*

Be it known that I, ABEL S. LINDKWIST, a subject of the King of Sweden, residing at Springdale, in the county of Allegheny and State of Pennsylvania, have invented certain new and useful Improvements in Gas-Valves, of which the following is a specification, reference being had therein to the accompanying drawing.

This invention relates to gas valves, and the objects of my invention are, first, to provide positive and reliable means in connection with a valve for automatically closing the same, should the back pressure of the gas line be reduced; second, to provide a valve that can be advantageously used in connection with the supply pipe of a stove for closing the gas supply when the connecting pipe or hose of the stove bursts; and third, to provide a simple, durable and inexpensive valve that will prevent the escape of gas and the asphyxiation of persons when a hose accidentally bursts or becomes disconnected.

I attain the above objects by a valve, the automatic action of which entirely depends upon the back pressure of gas within a pipe or hose, while the valve can be positively controlled by manual operation.

Referring to the drawings, Figure 1 is an elevation of a valve constructed in accordance with my invention, Fig. 2 is a vertical sectional view of a valve, Fig. 3 is an enlarged cross sectional view of a valve taken on the line X—X of Fig. 2 looking in the direction of the arrow of said figure, Fig. 4 is a similar view taken on the line W—W of Fig. 2 looking in the direction of the same arrow, and Fig. 5 is an elevation of a modified form of valve.

In the accompanying drawings, 1 designates a gas supply pipe to which is attached an elbow 2 having an integral valve body 3 provided with a stepped nipple 4, to which is attached the end of a flexible hose or pipe 5 adapted to connect with the valve 6 controlling the supply of gas to a stove 7, or a similar structure.

In the valve body 3 is located a rotatable plug 8 controlling the passage of gas from the elbow 2 to the nipple 4, and the valve 6 is similarly constructed, this construction being of the ordinary and well known type common to gas valves.

In the nipple 4 is located a horizontal partition 9 having openings 10 formed therein and a seat 11 for a spherical valve or ball 12. Detachably mounted in the upper end of the nipple 4, is a sleeve 13 having a valve seat 14 formed therein for the valve 12. Said valve when engaging said seat closing the sleeve 13 and shutting off the supply of gas to the hose or pipe 5.

With the gas turned on, the back pressure in the hose or pipe 5 retains the valve 12 upon the seat 11 of the partition 9, allowing gas to pass around the valve 12, but, when the back pressure is released, by the bursting of the hose or pipe 5, or by said hose or pipe becoming accidentally detached, the pressure of the gas forces the valve 12 upwardly upon the seat 14 and shuts off the supply of gas to the hose or pipe 5.

In Fig. 5 of the drawings I have illustrated a slight modification of my invention, wherein the valve body 3 is provided with a straight connection 15, in lieu of the elbow connection 2, as it is essential to obtain a positive operation of the valve, that said valve be retained in a vertical position.

While in the drawings forming a part of this application there is illustrated the preferred embodiments of my invention, I would have it understood that the details of construction can be varied or changed as to the shape, proportion and manner of assemblage without departing from the spirit of the invention.

Having now described my invention, what I claim as new, is:—

In combination, an elbow adapted to communicate at one terminus with a gas supply, a plug casing formed integral with the other terminus of said elbow and extending transversely with respect thereto, a plug mounted in said casing for controlling the passage of gas from the elbow, a nipple formed integral and communicating with said plug casing and disposed at right angles with respect to said casing, a partition located in said nipple at a point removed from its lower end and provided with openings and further having a centrally-disposed solid portion constituting valve seat, a sleeve mounted in the upper end of said nipple and having its inner end beveled to constitute a valve seat, and a valve within said nipple and interposed between the said valve seats.

In testimony whereof I affix my signature in the presence of two witnesses.

ABEL S. LINDKWIST.

Witnesses:
 EDW. ECKSTROM,
 MAX H. SROLOVITZ.